(No Model.) 2 Sheets—Sheet 1.
C. A. LINDSTRÖM.
BICYCLE.
No. 574,918. Patented Jan. 12, 1897.
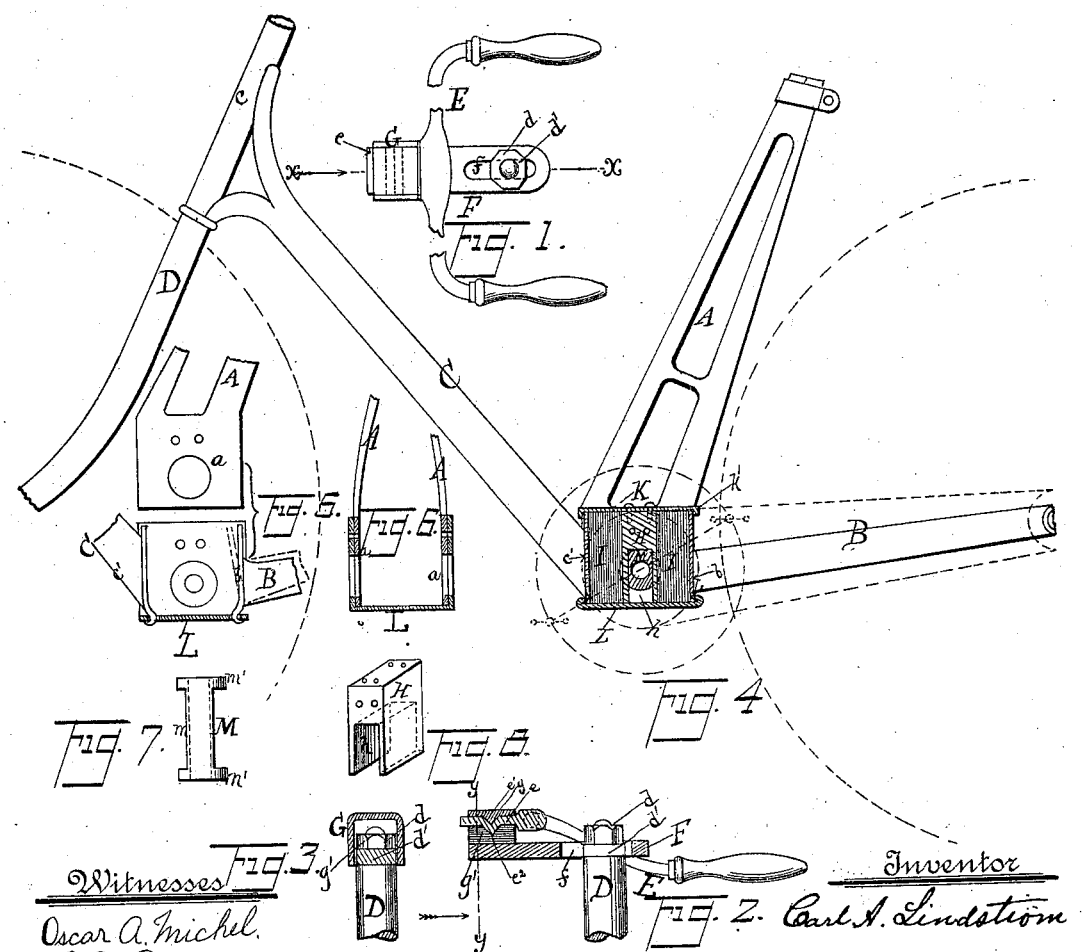
Witnesses
Oscar A. Michel.
H. Wahlberg
Inventor
Carl A. Lindström
By A. W. Almquist — Atty (No Model.) 2 Sheets—Sheet 2.
C. A. LINDSTRÖM.
BICYCLE.
No. 574,918. Patented Jan. 12, 1897.
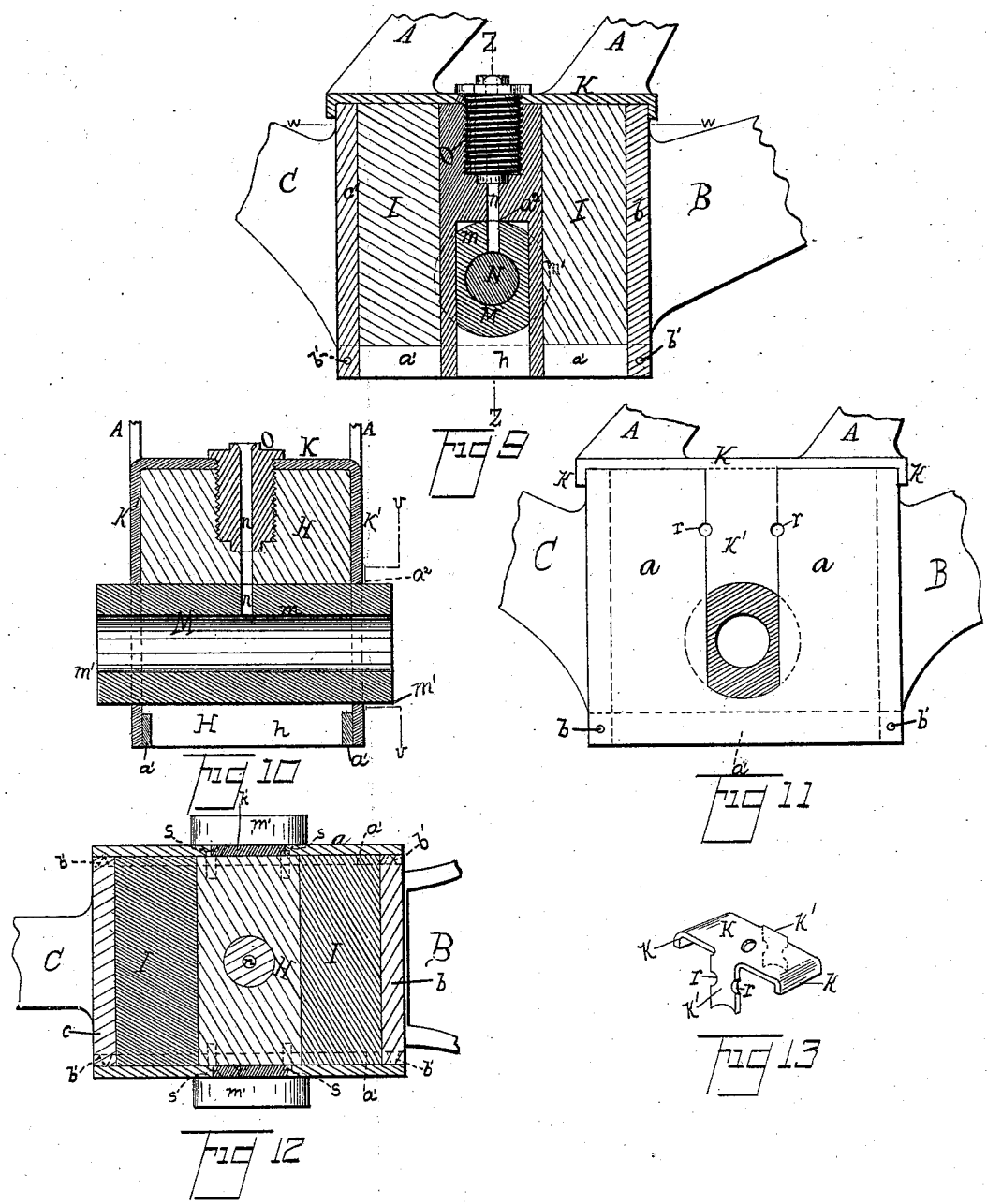
Witnesses
Oscar A. Michel
A. Wahlberg
Inventor
Carl A. Lindström
By A. W. Almqvist Atty

UNITED STATES PATENT OFFICE.

CARL A. LINDSTRÖM, OF ROCKAWAY, NEW JERSEY.

BICYCLE.

SPECIFICATION forming part of Letters Patent No. 574,918, dated January 12, 1897.

Application filed June 1, 1892. Serial No. 435,184. (No model.)

*To all whom it may concern:*

Be it known that I, CARL ALBIN LINDSTRÖM, a citizen of Sweden, and a resident of Rockaway, in the county of Morris and State of New Jersey, have invented certain new and useful Improvements in Bicycles, of which the following is a specification.

My invention relates to velocipedes in general, though more especially intended for those having two wheels, or so-called "bicycles," and has for its object to provide in a simple and effective manner the elasticity needed to counteract and neutralize the jar or vibration due to concussion when riding over small stones or other equivalent obstructions, and thus to give ease and comfort to the rider.

The invention will be hereinafter fully described and specifically claimed, reference being had to the accompanying two sheets of drawings, in which—

Figure 1 is a top view of the steering-handle attachment. Fig. 2 is a section of the same, taken on the line $x$ $x$ of Fig. 1. Fig. 3 is a cross-section on the line $y$ $y$ of Fig. 2, seen in direction of arrow 1 of Figs. 1 and 2. Fig. 4 is a partial side view of a bicycle, showing in section one modification of my improvement for elastically connecting the wheels and supporting the seat. Fig. 5 is a detail sectional view of the pieces which form the sides and bottom of the box of said elastic connection and support. Fig. 6 is a vertical cross-section of the same pieces. Fig. 7 is a top view of the crank-shaft bearing. Fig. 8 is a perspective view of the piece which covers and retains the said bearing in the aforesaid box. Fig. 9 shows in longitudinal vertical section a preferred modification of my improvement for elastically connecting the wheels and supporting the seat. Fig. 10 is a cross-section of the same on the line $z$ $z$ of Fig. 9. Fig. 11 is a side view of the same, the head or flanged end of the bearing only being in section on the line $v$ $v$ of Fig. 10. Fig. 12 is a horizontal section of the same, taken on the line $w$ $w$ of Fig. 9. Fig. 13 is a perspective view of the retaining-cap which covers and forms part of the said elastic connecting and supporting device.

A designates the post or upright which supports the seat or saddle.

B is the hind-wheel-pivoting bar or that in which the hind-wheel axle has its bearings.

C is the front connecting-bar or that which, extending forward, has the usual hollow post or upright bearing $c$, in which is pivoted the upper end of the forked swivel-post D, between whose prongs the front or steering wheel revolves, the axle of the latter being mounted in the lower ends of said prongs.

E is the steering-handle, attached to the upper end of the swivel-post D.

In order to provide elasticity and means of adjusting the position of the handle more or less forward or aft to suit the grip of the rider, I have constructed the handle attachment in the following improved manner: The extreme upper end of the post D is turned down in size and threaded to receive a nut $d$, and below the said threaded portion it is reduced at $d'$ on opposite sides to form two vertical parallel flat surfaces and shoulders below the same. A flat bar or crank F has longitudinally a slot $f$, in which the thus flattened part of the post D fits snugly, so as to prevent turning the crank without also turning the swivel-post D with it, but allowing the crank to be slid forward or back within the limit of the length of the slot $f$ and when thus adjusted in the desired position to be firmly secured by tightening the nut $d$.

To and across the forward end of the crank F is brazed or otherwise firmly secured a clip G, provided within and crosswise of the crank with a preferably V-shaped ridge or projection $g$.

The middle of the steering-handle bar E has a projection $e$, fitting the inner width of the clip G, and the said projection $e$ has in its upper surface a groove $e'$, corresponding with and receiving the ridge $g$, and underneath a ridge $e''$, which indents and compresses a rubber block or spring $g'$, interposed in the clip between the projection $e$ and the crank F. By this construction the handle is held rigidly against lateral and longitudinal play within the clip, but elastically against sudden vertical shocks or vibrations.

The desired elastic support of the seat or saddle I obtain by making at the crank-shaft for propulsion an elastic center or connection between the seat-post A and the bars B and C in the following manner: The hollow seat-post A widens downward, its weight being proportionally reduced by openings both in the sides, front, and rear, as seen in Figs. 4, 6, and 9, and ends with two flat parallel plates $a$, forming the two side pieces or walls of a box or inclosure, the end walls of which are formed by plates or flanges $b$ and $c'$, made rigid with the bars B and C transversely to said bars. These flanges $b$ $c'$ are pivoted at or near their lower edges to oscillate between the side walls $a$, and between them and a central stationary block H, which incases the crank-shaft bearings, are interposed springs I, preferably soft-rubber blocks. These, yielding elastically to any extra pressure, whether sudden or gradual, distribute and convert the effect thereof into gradual elastic motion, imparting it thus to the seat and the rider thereon.

A cap-plate K, secured to the center block H, (see Figs. 4, 9, 10, 11, and 13,) covers the said box and confines, by downbent end flanges $k$, the upper edges of the plates $b$ $c'$, and thus prevents their being dislocated or swung out of normal position by the action of the springs I when there is no weight upon the bicycle.

In the modifications shown in Figs. 4, 5, and 6 a U-shaped plate L, fastened with its legs to the plates $a$ of the seat-post, forms a bottom to the box, and to the said bottom are hinged the plates $b$ $c'$, either by bending and interlocking their lower edges and the end edges of the said bottom, as in Fig. 4, or by making hook-like projections on their lower edges, entering and interlocking with slots or holes through the said bottom, as in Fig. 5. In both of said modifications the round ends of the crank-shaft bearing M fit in and through holes in the side walls of the box and are flush with the outer surfaces of the said walls; but while these modifications are shown as tending to illustrate this part of my invention generically I much prefer the specific construction shown on Sheet 2, which I will now describe.

N is the shaft, to which are secured the foot-cranks for propulsion and the chain-wheel, which by chain belt is connected to a smaller chain-wheel on the axle of the hind wheel or driving-wheel. These are indicated in Fig. 4. The shaft N revolves in the bearing M, which is simply an axially-bored cylindrical bar reduced on diametrically opposite sides, so as to form a flat shank $m$ of parallel sides except at the ends, where the cylinder is unbroken, thus leaving heads or flanges $m'$ on the flat shank.

Along the inner bottom edge each plate $a$ is thickened by a cleat $a'$, brazed, welded, or otherwise made rigid with it. Oppositely, near the ends of these opposite cleats, they are provided with preferably conical sockets, in which the frame-bars B C are pivoted by conical pins $b'$, formed or secured upon opposite edges of their end plates or flanges $b$ $c'$, the plates $a$ of the seat-post A being sprung apart sufficiently to receive them.

The flat shank $m$ of the bearing M is then pressed down to the bottom of the vertical slots $a^2$, made in the plates $a$ to receive it, in such manner that the heads $m'$ of bearing M engage the outer surfaces of the plates $a$, thus tending to press them toward each other and keep the pivots $b'$ in their sockets. The center block H, which is of the same length as the width between the side plates $a$ when the latter are tightly bearing against the heads $m'$ of the shank $m$ and which has longitudinally a slot $h$ fitting snugly the said shank, is then forced down between the plates $a$ to incase the said shank, as in Fig. 9, after which the rubber blocks or springs I are inserted and rest, if preferred, upon the cleats $a'$, the box having no bottom. The cap-plate K is then secured to the block H by a central headed screw O, which is bored through axially and the bore continued through the block H and bearing M to serve as an oil-hole $n$ for lubricating the crank-shaft N. The block and cap, being thus firmly secured together, are prevented from rising out of proper position by the following means:

In addition to the end flanges $k$, previously described with reference to Fig. 4, which serve as stops to confine the pivoted flanges $b$ $c'$ in normal position, the cap K has at opposite sides a depending arm or flange $k'$, which fits tightly in the width of the slot $a^2$ in plate $a$ and bears with its lower end snugly upon the shank $m$ or bearing of crank-shaft.

In each line formed of the contiguous edges of the depending arm $k'$ and the slot $a^2$ I bore a hole $r$ of the exact diameter of the head of a screw $s$, so that the said hole forms a semicircular notch in each of the said adjacent edges, and with a smaller drill, equal to the inside diameter of the screw-thread, I deepen the said hole by boring into and forming a socket in the center block H, then tap the said socket to the pitch of the screws $s$. The shanks of these screws being then turned home are held firmly in the center block H, while their heads firmly interlock the arms $k'$ and plates $a$, the flat end surfaces of the screw-heads being flush with the contiguous outer surfaces of the arms $k'$ and plates $a$.

The bar B is of course forked as usual and the drive-wheel pivoted between the prongs of the fork. By the construction described the bicycle may be mounted from the side as well as the rear, and a separate spring for elastically supporting the seat on the post A may be dispensed with.

I claim—

1. In a bicycle, or similarly-steered vehicle, the combination of a steering-post having a clip or socket, provided with an internal ridge or groove, a handle having a correspondingly grooved or ridged projection entering said clip or socket, and a spring or elastic substance interposed between said post and projection.

2. In a bicycle, or similarly-steered vehicle, the combination of a steering-post reduced at its upper end on opposite sides to form shoulders and flat parallel surfaces, and turned down and threaded above said reduced portion, with a handle having a slotted arm fitted to slide upon the said reduced flat portion, and a nut fitting the said threaded end for securing the said slotted arm in the adjusted position.

3. In a bicycle, or similar vehicle, the combination of the seat-post A, having bearing for the propelling crank-shaft with the frame-bars B and C pivoted to the said post at opposite sides of the said crank-shaft, and springs interposed between them and said bearing and tending to keep them apart.

4. In a bicycle or similar vehicle, the combination of the seat-post A, having the lower side pieces or plates $a$, the frame-bars B, C, having end flanges $b, c'$, pivoted between said side pieces, a cap K secured to said side pieces and having end flanges $k$ limiting the outward oscillation of said flanges $b, c'$, and a spring or springs tending to keep said flanges $b, c'$, apart.

5. In a bicycle or similar vehicle, the combination of the seat-post A having the lower side pieces or plates $a$, the frame-bars B, C, having end flanges $b, c'$, pivoted between said side pieces, the crank-shaft bearing having flat portion or shank $m$, the center block H having slot $h$ fitting said flat shank, the retaining-cap K secured to said side pieces $a$, the central screw O securing the said cap to said center block and having oil-hole $n$ for the crank-shaft, and the springs I, substantially as set forth.

6. In a bicycle or similar vehicle, the combination of the seat-post A having lower side pieces $a$ with slots $a^2$, the frame-bars B, C, having end flanges $b, c'$, pivoted between said side pieces, the crank-shaft bearing M fitting with its flat shank $m$ in the said slots $a$ and lapping with its heads $m'$ the outer surfaces of the side pieces $a$ to prevent their spreading, the center block H preventing inward bending of the said side pieces $a$, the retaining-cap K and springs I, substantially as specified.

7. In a bicycle or similar vehicle, the combination of the seat-post A having lower side pieces $a$ with slots $a^2$, the frame-bars B, C, having end flanges $b, c'$, pivoted between said side pieces, the crank-shaft bearing M fitting with its flat shank $m$ in the said slots $a$ and lapping with its heads $m'$ the outer surfaces of the side pieces $a$ to prevent their spreading, the center block H preventing inward bending of the said side pieces $a$, the retaining-cap K having depending arms or flanges $k'$ fitting the said slots $a^2$, the locking-screws $s$ threaded into the center block H in the line of junction between the edges of said arms $k'$ and slots $a^2$, and the springs I, substantially as specified.

Signed at Rockaway, in the county of Morris and State of New Jersey, this 18th day of May, A. D. 1892.

CARL A. LINDSTRÖM.

Witnesses:
OSCAR THUNE,
DAVID OLSSON.